United States Patent
Maheshwari et al.

(10) Patent No.: US 12,106,252 B2
(45) Date of Patent: Oct. 1, 2024

(54) SYSTEM AND METHOD FACILITATING DECISION MAKING FOR DISINFECTANT DOSING IN WATER IN WATER DISTRIBUTION NETWORKS

(71) Applicant: Indian Institute of Technology Bombay, Mumbai (IN)

(72) Inventors: Abhilasha Maheshwari, Mumbai (IN); Ravindra Dheerendra Gudi, Mumbai (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 608 days.

(21) Appl. No.: 17/059,242

(22) PCT Filed: May 31, 2019

(86) PCT No.: PCT/IN2019/050427
§ 371 (c)(1),
(2) Date: Nov. 26, 2020

(87) PCT Pub. No.: WO2019/229775
PCT Pub. Date: Dec. 5, 2019

(65) Prior Publication Data
US 2021/0206656 A1    Jul. 8, 2021

(30) Foreign Application Priority Data
May 31, 2018  (IN) .............................. 201821020455

(51) Int. Cl.
| | | |
|---|---|---|
| G06Q 10/0639 | (2023.01) | |
| C02F 1/00 | (2023.01) | |
| G06F 18/2321 | (2023.01) | |
| G06Q 10/0631 | (2023.01) | |
| G06Q 50/06 | (2012.01) | |

(52) U.S. Cl.
CPC ....... G06Q 10/06395 (2013.01); C02F 1/008 (2013.01); G06F 18/2321 (2023.01); G06Q 10/06315 (2013.01); *C02F 2209/003* (2013.01); *C02F 2303/04* (2013.01); *G06Q 50/06* (2013.01)

(58) Field of Classification Search
None
See application file for complete search history.

(56) References Cited

U.S. PATENT DOCUMENTS

2004/0126365 A1 *   7/2004   Villamar ................ G16H 50/80
                                                        702/19

* cited by examiner

*Primary Examiner* — Richard C Gurtowski

(57) ABSTRACT

Embodiments herein provide a system and a method facilitating a local decision making for disinfectant dosing in water as the water flows through a Water Distribution Networks (WDN). WDN data is collected and the WDN is partitioned into one or more sub-systems by using a data based partitioning methodology over the WDN data. One or more decision variables are mapped to the one or more sub-systems for coordinated decentralized control of water quality in large WDN. The decision variables comprise disinfectant dosing rate to be applied to water at the one or more booster stations.

8 Claims, 8 Drawing Sheets

SYSTEM AND METHOD FACILITATING DECISION MAKING FOR DISINFECTANT DOSING IN WATER IN WATER DISTRIBUTION NETWORKS

FIELD OF INVENTION

Present disclosure in general relates to water quality and more particularly to disinfectant dosing in water in a Water Distribution Network (WDN). The present application is based on, and claims priority from an Indian Application Number 201821020455 filed on 31 May 2018, and PCT/IN2019/050427 filed on 31 May 2019, the disclosure of which is hereby incorporated by reference herein.

BACKGROUND OF INVENTION

Tackling water contamination and maintaining acceptable water quality in large Water Distribution Networks (WDN) is important from a public health viewpoint. To address the problem of potable water consumption, disinfectants are used in Water Distribution Network (WDN) for maintaining a microbiological quality of potable water throughout the WDN. Most of the disinfectants used worldwide for this purpose are chlorine based.

Disinfectant residual levels (free chlorine residuals) in large water distribution networks need to be maintained within a prescribed acceptable range (as per the global drinking water standards (WHO 2017)), in order to prevent microbial re-growth and also to minimize harmful Disinfection By-Products (DBP) formation resulting from high levels of the disinfectant dosage. Furthermore, the WDN exhibit spatial and temporal variations in water quality at different points in the WDN.

Management of water quality in the distribution network may be performed by adapting conventional systems engineering tools. The conventional system engineering tools comprise modelling, optimization, and control.

Water quality control models involving multiple species such as disinfectant microbes, natural organic matter (NOM) and DBP should be developed and further linked to a hydraulic model to provide a desired level of quality in the water in terms of disinfectant residual levels. Along with this, spatial variability of chlorine residual levels, time varying consumer demands, changing flow pattern and variation in transport and hydraulic parameters (together considered as dynamic parameters) needs to be incorporated into the water quality control models to predict residual chlorine and DBP levels at plurality of nodes in the distribution network. The involvement of multiple species and consideration of the dynamic parameters imposes challenges in optimal control of water quality in such distributed parameter systems.

OBJECT OF INVENTION

The principal object of the embodiments herein is to provide a system and method facilitating a local decision making for disinfectant dosing in water as the water flows through a Water Distribution Networks (WDN).

Another object of the embodiments herein is to provide partitioning of the WDN by using the WDN data into plurality of sub-systems by using a data based partitioning methodology.

Another object of the embodiments herein is to provide the mapping of one or more decision variables to each sub-system for applying disinfectant dosage in water at the plurality of sub-systems.

SUMMARY

Accordingly, embodiments herein provide a method facilitating a local decision making for disinfectant dosing in water as the water flows through the Water Distribution Networks (WDN). The method comprises collecting WDN data and partitioning the WDN by using WDN data into plurality of sub-systems, by using a data based partitioning methodology. The method further comprises mapping one or more decision variables to the plurality of sub-systems. The decision variables comprise disinfectant dosage to be applied in water at the plurality of sub-systems.

Embodiments here also provide a system for facilitating a local decision making for disinfectant dosing in water as the water flows through Water Distribution Networks (WDN). The system comprises a processor and a memory coupled to the processor. The memory stores a plurality of set of instructions to be executed by the processor. The processor is configured to collect WDN data and partition the WDN by using the WDN data into plurality of sub-systems, by using a data based partitioning methodology. The processor is further configured to and map one or more decision variables to the plurality of sub-systems. The decision variables comprise disinfectant dosing rate to be applied in water at the plurality of sub-systems.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This method is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Accordingly, embodiments herein provide a system and method facilitating a local decision making for disinfectant dosing in water as the water flows through the Water Distribution Networks (WDN). A sub-system control-based method is used for controlling disinfectant dosing in water in Water Distribution Network (WDN). The sub-system control-based approach (also known as decentralized control) is developed by using a model coordination method for solving large scale optimization problems in the WDN. The proposed system and method solves a problem of two-point constrained control of free residual disinfectant levels to maintain potable water quality as the water flows through pipes across large distribution networks.

Adequate free chlorine residuals are required to be maintained (secondary disinfection) in treated water to prevent microbial re-contamination in water as it reaches to consumers through the pipe distribution networks. Therefore, Global standards for drinking water requires maintenance of free chlorine residual (disinfectant) levels above the minimum concentration of 0.2 mg/L in order to prevent microbial re-growth in water. Simultaneously, it also ensures that maintenance of free chlorine residual (disinfectant) levels should be below a maximum concentration (4 mg/L) which otherwise promotes formation of harmful and carcinogenic disinfectant by products (DBPs) in water.

Thus, considering the transport aspect of water in large networks to prevent microbial regrowth problems, maintaining adequate residual concentrations is the two-point constrained control problem for water quality.

Figure 1:
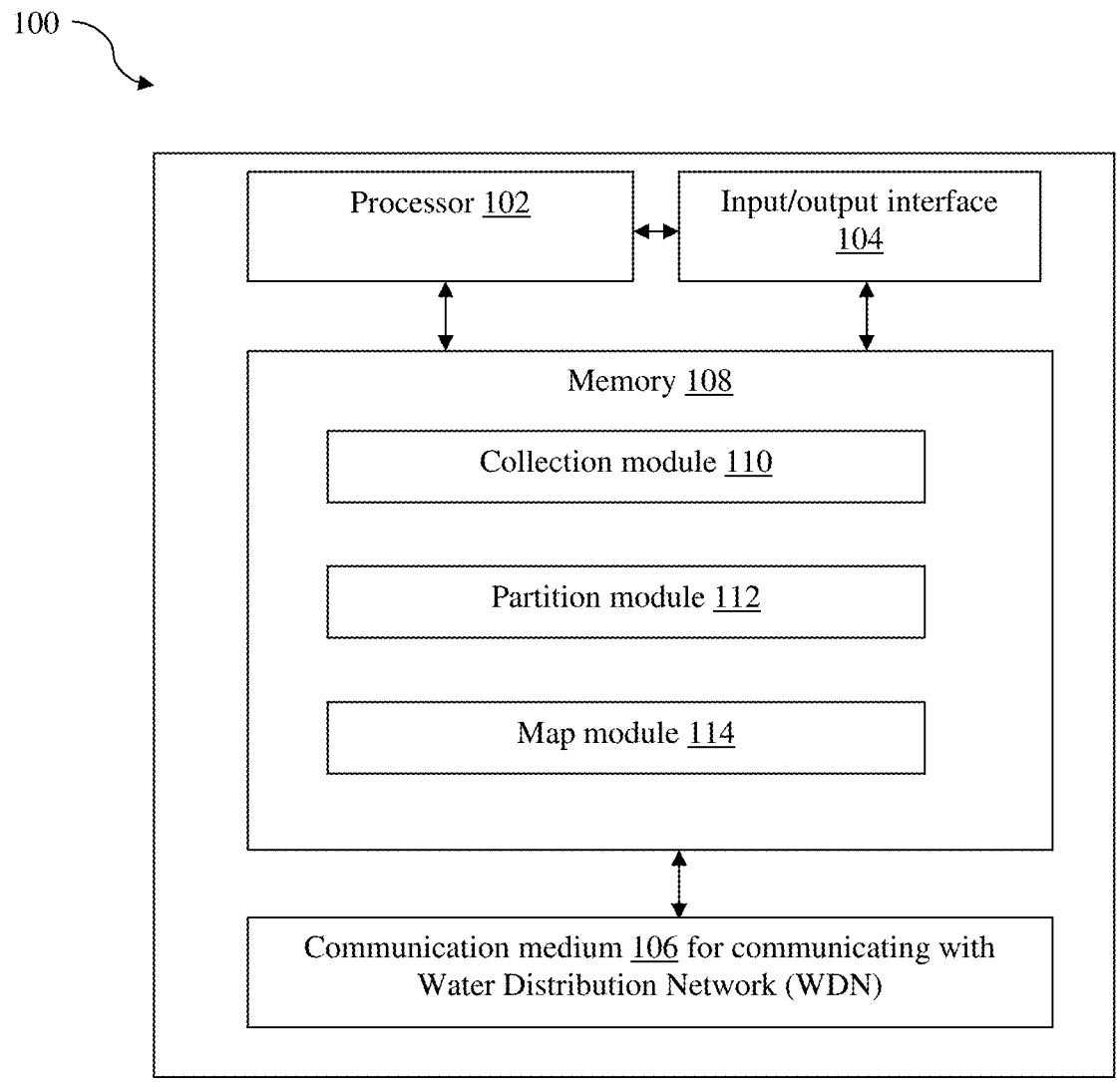
FIG. 1 illustrates a block diagram of a system facilitating a local decision making for disinfectant dosing in water in Water Distribution Networks (WDN), according to the embodiments as disclosed herein.
Figure 4:
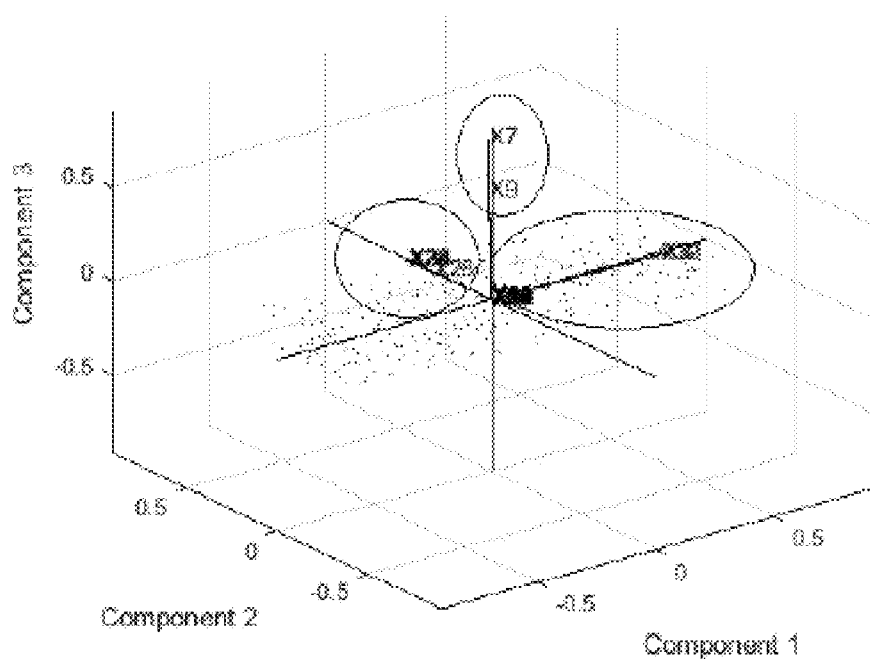
FIG. 4 illustrates PCA Loadings Plot for nodes behavior with respect to chlorine residual concentration, according to the embodiments as disclosed herein.

Referring now to the drawings, and more particularly to FIGS. 1 and 4, there are shown preferred embodiments.

According to an embodiment, referring to FIG. 1, a system 100 facilitating a local decision making for disinfectant dosing in water as the water flows through the Water Distribution Networks (WDN) is shown. The system 100 comprises a processor 102 and an input/output interface 104 for communicating with the WDN through a communication medium 106. The processor 102 is coupled to a memory 108. The memory 108 stores a plurality of modules to be executed by the processor 102. The modules store a set of instructions for performing one or more tasks to facilitate a local decision making for dosing disinfectant in water in the WDN.

The collection module 110 is configured to collect WDN data. The WDN data comprises data related to distribution of water at all demand nodes in the WDN and disinfectant dosage at each of the dosage points (also referred as booster stations) in the WDN.

The partition module 112 is configured to partition the WDN by using the WDN data into plurality of sub-systems by using a data based partitioning methodology. The plurality of sub-systems comprises one or more regions of local cause-effect relationships, where cause is disinfectant dosing rate at one or more dosage point (booster stations) in the WDN and effect is disinfectant residual levels (free chlorine concentration) at each node in sub-system.

The partition module 112 is configured to perform a statistical analysis over the WDN data. The statistical analysis comprises a Principal Component Analysis (PCA) and is used for decomposing the WDN data into the one or more sub-systems (also referred as partitioned data).

The partition module 112 is further configured to identify cluster of nodes having similar behavior with respect to disinfectant dosage applied at different dosage points (booster stations) in WDN. The nodes comprise demand points in WDN. The dosing rates are applied to maintain the disinfectant residual and quality levels in WDN. The partition approach of the proposed system 100 helps to greatly simplify the spatial complexity by partitioning large WDN in sub-systems for local decision making of disinfectant dosage in water as water transports through the WDN.

The map module 114 is configured to map one or more input-output pairs for decentralized control through one or more sub-systems of the WDN resulting from the partial correlation analysis. In the input-output pair, the input refers to the disinfectant dosing rate for a sub-system and output refers to disinfectant (free chlorine) residual at each node in the sub-system. The partial correlation analysis approach on clusters resulting from the principal component analysis in partition module 112 also identify the nature and extent of interactions between nodes in a sub-system and several disinfectant dosing points (booster stations). These interactions are variations in water quality at any downstream node due to disinfectant dosage at more than one booster stations in upstream of the network (multiple input points affecting multiple output variables). The sub-systems resulting from partial correlation analysis comprises cluster of nodes mapped to one or more disinfectant dosing point based on local cause and effect relationships.

In an embodiment, in case the WDN is decentralized, there might be interactions that still persists in the partitioned data. A model coordination approach (discussed later) is used for providing a coordinated decision-making regarding the disinfectant dosage to be applied at the plurality of sub-systems (booster points) in case of the sudden contamination events in WDN.

A map module 114, is further configured to map nodes in a sub-system (control variable) with one dosing point (manipulating variable), with a view of minimizing interactions by using an Effective Relative Gain Array Analysis (ERGA) approach. The ERGA approach is one of a design method for multi-input and multi-output systems (in control systems) and is used by the present system 100.

The map module 114 is configured to map control and manipulating variables for each sub-system obtained after the partition of WDN. The manipulating variables comprise disinfectant dosage to be applied in water at the one or more dosing points (booster stations). The mapping of control and manipulating variables for each sub-system enables decentralized control of water quality.

In an example, the system 100 may be used for facilitating co-ordination in chlorine dosing rates among one or more decentralized actuators (booster stations considered here as WDN data) for maintaining the chlorine residual within regulatory zones of a predefined global health standards of minimum free residual concentration for drinking water quality, in an optimized manner.

Figure 2:
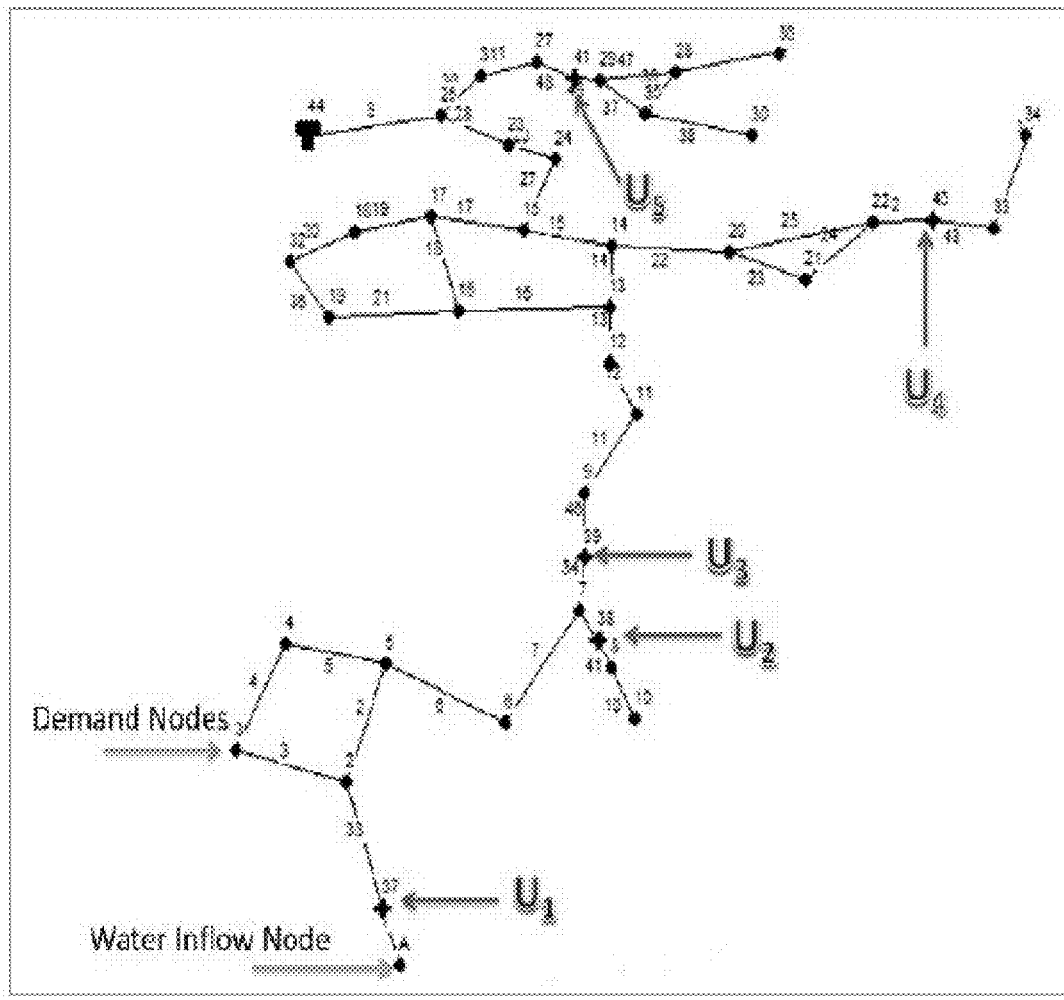
FIG. 2 illustrates an exemplary Water Distribution Network (WDN) of CH/BP, according to the embodiments as disclosed herein.

Referring to FIG. 2, the WDN data collected by the collection module 110 considered here is Cherry Hill Brushy Plains (CH/BP) network. The CH/BP network consists of five disinfectant dosing points (referred herein as $U_1$, $U_2$, $U_3$, $U_4$, $U_5$) and 34 demand nodes. The dosing points refer to disinfectant booster stations at one or more places in the WDN. An average flow of water considered in the CH/BP network may be 1174.9 Liter per minute (310 gpm). The demand at each of the node of the 34 demand nodes may be considered to be a predefined constant value (for a case where water is associated with a steady flow). As discussed above, the partition module 112 is configured to apply the PCA in order to identify clusters of similarly behaving nodes with respect to disinfectant dosage rate at several dosing points.

In an example embodiment, partitioning of the WDN for dealing with each of a large dimensionality, interactions, and spatial complexity of network may be implemented with a multispecies model. The implementation comprises three steps: (1) Principal components analysis (PCA), (2) Partial correlation analysis and (3) Effective relative gain array analysis (ERGA). The three steps may be carried out using the developed multispecies model for decomposing and sensitivity mapping of input-output pairs for local sub-systems. The stability of decentralized control loops may be analyzed using ERGA. The proposed strategy may be implemented on example WDN, and results are described below:

(1) PCA: PCA may be carried out as a partitioning approach for the WDN in order to cluster nodes having a similar behavior with respect to disinfectant dosage rate at plurality of dosing points. The data associated with the WDN (considered here) to perform the PCA may be generated by performing a steady flow (constant nodal demands) simulation experimental runs for case I using a multispecies model. Chlorine dosing rate at the 5 dosing points may be taken by random sampling having a usage in a range of 5 mg/min to 350 mg/min.

Figure 3:
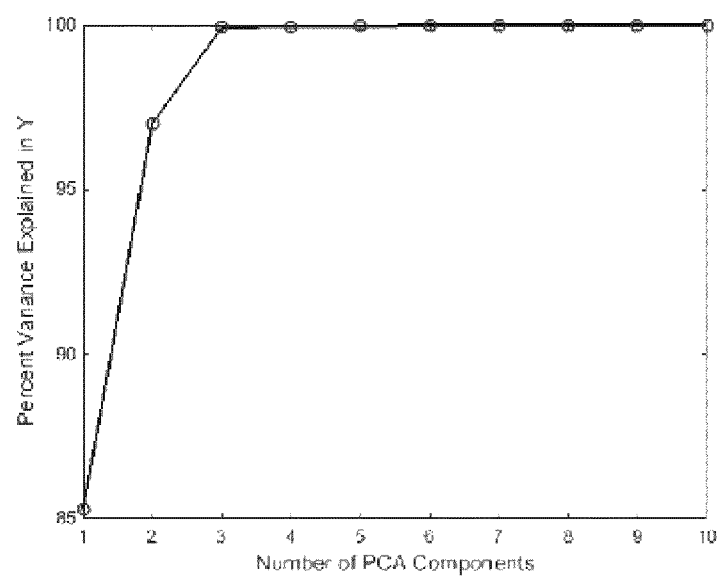
FIG. 3 illustrates cumulative plot of percentage variance explained by partial component analysis (PCA) based on chlorine residual concentration, according to the embodiments as disclosed herein.

In the example, the PCA is carried out separately for clustering the nodes based on each of chlorine residual concentration and the DBP (THM) concentration. X matrix generated here to carry out PCA has dimensions of 400×34 corresponding to 400 simulation runs and respective output concentration at 34 nodes in WDN. A cumulative plot of percentage variance explained by eigenvalue array generated from PCA in FIG. 3 illustrates that first three principal components explains 99.9% variation. Each component of the three components comprises of a group of variables as a linear combination of different scores and loadings.

Figure 5A:
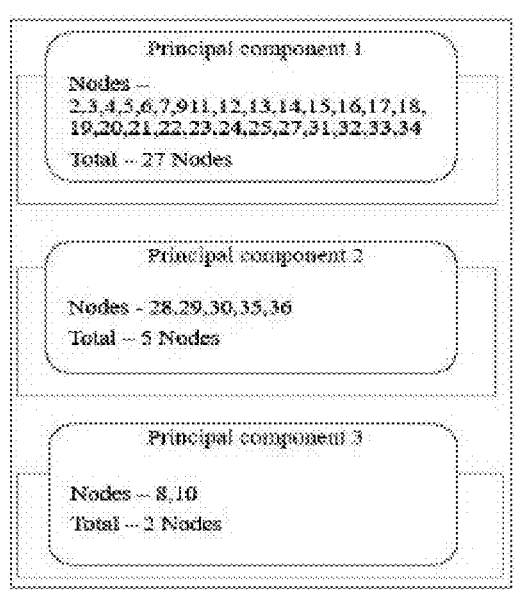
FIG. 5A illustrates First three Principle components from Loadings plot with respect to Chlorine residual, according to the embodiments as disclosed herein.
Figure 5B:
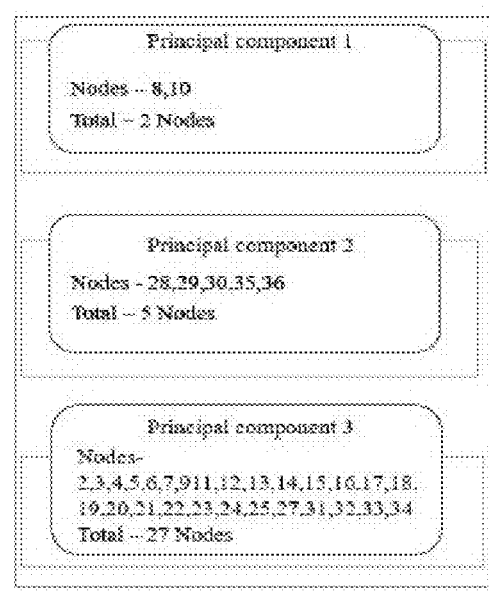
FIG. 5B illustrates First three Principle components from Loadings plot with respect to THM concentration, according to the embodiments as disclosed herein.

FIG. 4 illustrates a loading plot for nodes behavior with respect to chlorine residual and similarly with respect to THM concentrations (DBP), is then plotted for first three principal components to highlight similarly behaving nodes (or nodes with similar behavior) in each component. 3 clusters of nodes generated from the loadings plot may be specified in FIG. 5, with respect to each of the chlorine residual levels (as shown in FIG. 5A and THM formation (FIG. 5B). FIG. 5B also verifies the pronounced effect of the THM formation at dead end loops and branches of the WDN further constituting a first principal component and a second principal component.

Figure 6A:
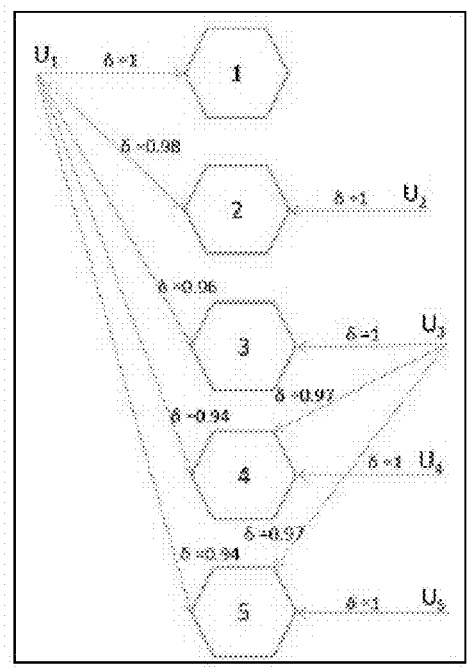
FIG. 6A illustrates Degree of correlation between each cluster and dosing point, according to the embodiments as disclosed herein.

(2) Partial Correlation Analysis: As discussed in step 1, output variables (nodal demands) clustered in the first step are correlated with more than one input (dosing station), to get more refined input-output pair mapping partial correlation analysis may be performed on the clusters obtained from PCA. The partial correlation analysis is performed on each of the three clusters (as discussed above) as one variable for estimating a degree of correlation between nodes and each input variable, while suppressing an effect of all other 4 inputs at a time. FIG. 6A illustrates an extent of correlation between nodes of each cluster and each input.

Figure 6B:
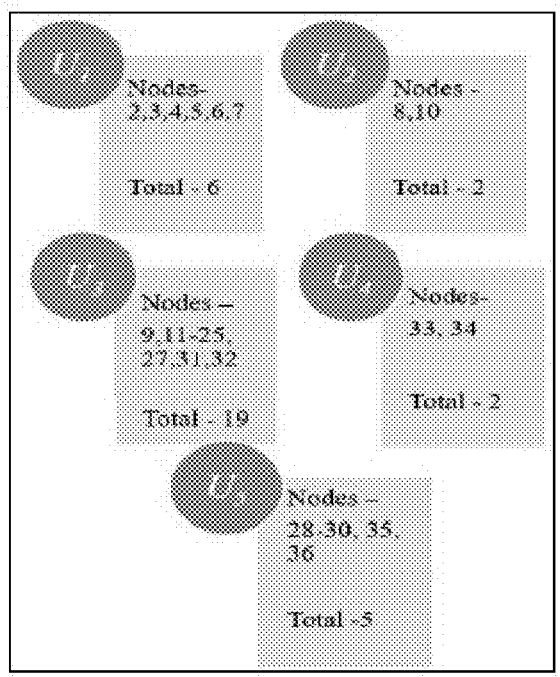
FIG. 6B illustrates Input-output pair mapping from partial correlation analysis, according to the embodiments as disclosed herein.

Pairs may then be formed between input and output variables as shown in FIG. 6B. The pairs may have a partial correlation coefficient of ($\delta$>0.99). Interaction analysis using the partial correlation approach also revealed coordinating variables for each cluster as shown in Table 3:

TABLE 3

| Cluster | Co-ordinating inputs |
|---------|----------------------|
| 2 | $U_1$, $U_2$ |
| 3 | $U_1$, $U_3$ |
| 4 | $U_1$, $U_3$, $U_4$ |
| 5 | $U_1$, $U_3$, $U_5$ |

(3) Effective Relative Gain Array Analysis (ERGA):

To get a feasibility and stability of control structure by clustering variables as shown above, the ERGA analysis may be performed based on the multivariate gain matrix. According to the ERGA based pairing criterion, pairing results in stable closed loop control configurations when ERGA is identity matrix or close to it. For minimal interactions, the input-output pairs are therefore mapped by considering ERGA elements that are close to unity in ERGA matrix, which is calculated form Equation 1 and Equation 2:

$$E = G(0).*\Omega \qquad \text{Equation (1)}$$

$$ERGA = E.*(E^{-1})^T \qquad \text{Equation (2)}$$

where, E is effective gain matrix, ERGA is Effective Relative Gain Array Matrix, G(0) is steady state gain matrix, $\Omega$ is bandwidth matrix and (.*) denotes Schur Product of matrices.

Figure 7:
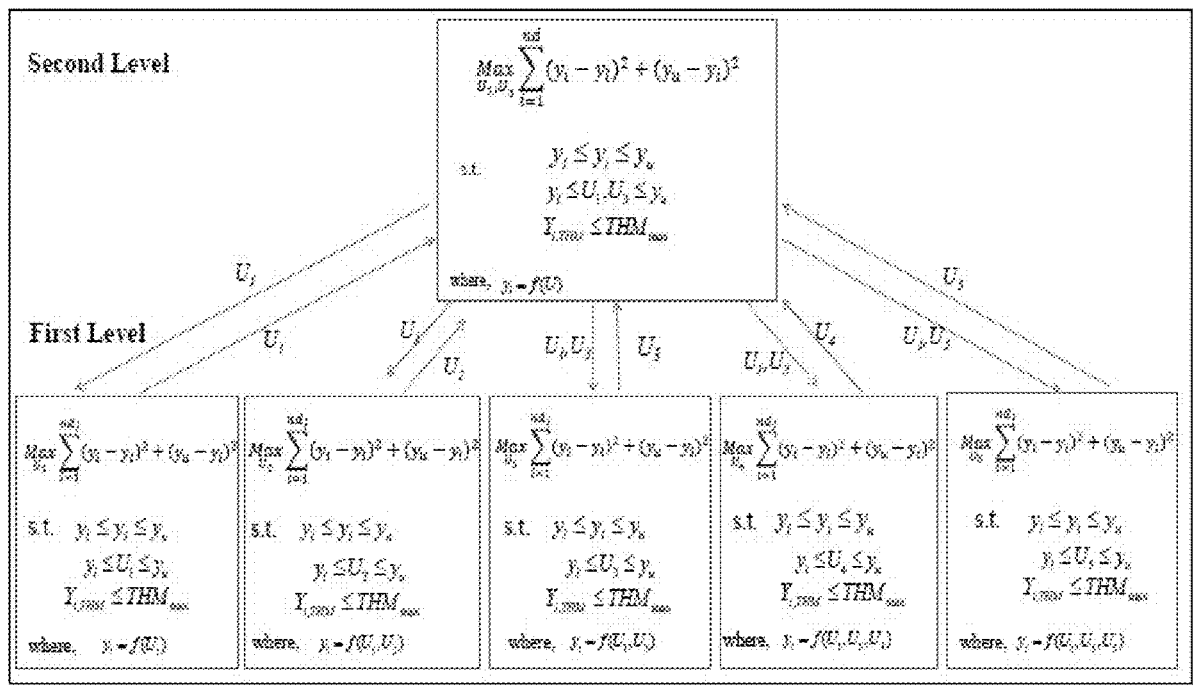
FIG. 7 illustrates a block diagram illustrating a model coordination method facilitating the local decision making for disinfectant dosing in the WDN, according to the embodiments as disclosed herein.

Referring to FIG. 7, a block diagram of a two-level decomposition, the model co-ordination method, using co-ordination links resulted from partial correlation for the CH/BP network, is shown. Chlorine dosage at booster station 1 and 3 ($U_1$, $U_3$) are determined as the coordinating variables between the two levels for which the coordination is to be achieved.

First level (also referred as Lower level): Five sub-problems corresponding to each of the sub-system. Each sub-problem of the five sub-problems at the first level corresponds to disinfectant dosing point and free chlorine residual at each of the demand node in the corresponding sub-system. Each of the sub-system is associated with an independent manipulating variable referred as $U_j$ and coordinating manipulating variables $U_1$ and $U_3$ communicated by second level (higher level). The coordinating variables are decision variable for the second level and are fixed parameter for the first level sub-system based on which the first level-optimize local decision variable. At second level the coordinating manipulating variables (or simply coordinating variables) are optimized by taking account of decisions from each of the sub-systems at the first level. The coordinating variables are then given as parameters to the sub-systems at the first level to help the first level sub-systems in taking decision with regard to disinfectant dosing rate locally for each of the sub-systems in the first level. Use of the coordinating variables in an iterative scheme followed by the processor 102 in order to obtain an optimal value of the objective function for each of the first level and the second level results in coordinated local decision making to take corrective actions during the sudden contamination events.

Corresponding to each of a fixed value $U_1°$ and $U_3°$, the lower level solves independent optimization sub-problems in each unit and communicates independent variables to a next upper (also referred second level). The second level then generates an estimate of $U_1$ and $U_3$. The formulation for each sub-problem j is as follows, where:
Objective Function:

$$\underset{U_j}{\text{Max}} \sum_{i=1}^{ndj} (y_{ji} - y_l)^2 + (y_u - y_{ji})^2 \qquad \text{Equation (3)}$$

Constraints $y_l \leq y_{ji} \leq y_u$ $i=1,2,3 \ldots nd_j$     Equation (4)

$Y_{i,THM} \leq TH_{Mmax}$     Equation (5)

$y_l \leq U_j \leq y_u$     Equation (6)

where, $y_{ji}$ and $Y_{i,THM} = f(U_j, U_1, U_3)$
$y_{ji}$=chlorine residual concentration at $i_{th}$ nodal point in $j_{th}$ sub-system (mg/L)
$n_{dj}$=total number of demand nodes in $j_{th}$ sub-system
$y_l$=lower bound on chlorine concentration (mg/L)
$y_u$=upper bound on chlorine concentration (mg/L)
$Y_{i,THM}$=THM concentration at ich node in each cluster (μg/L)
$THM_{max}$=max. concentration limit on THM concentration (80 μg/L)
Uj=disinfectant dosage concentration at $j_{th}$ booster station (mg/L)

In the above objective function, the deviations from each of the lower limit and the upper limits ($y_l$ and $y_u$) on the chlorine residuals are maximized, so that the chlorine levels at each node are set at values that enable:
  that uncertainties are well considered in the flow of water and mixing models
  Optimal chlorine residuals are achieved so that the system 100 may facilitate a desired rate of rejection of buildup in the contaminant levels in the water at each of the sub-systems.
  Equation 2 above represents the appropriate objective function.
  Equation 4 specifies limits on a maximum permissible concentration of THM formation imposed by USEPA and Equation 5 binds the dosage rates to be applied to each of the sub-system in the WDN.

The system 100 results in an objective function as presented in Equation (3) above so as to maintain uniform spatial distribution of chlorine residuals in a compliance zone, across the CH/BP network through optimal disinfectant booster dosage. Furthermore, regulating the chlorine residuals at mean level of compliance zone through the above discussed equations (equation 3 to equation 6) provide an opportunity to tolerate contamination due to uncertainties and delays in initiating remedial actions 10 as it takes time for chlorine residuals to increase/decrease in response to control action.

Details on second level (also referred as higher level): The second level estimates the coordinating variables ($U_1$, $U_3$) accounting the locally estimated $U_j$ in the first level through the following optimization formulation. The decision variables here in the second level correspond to a smaller set of variables represented as $U_1$ and $U_3$.
Objective Function:

$$\underset{U_1,U_3}{\text{Max}} \sum_{i=1}^{nd} (y_i - y_l)^2 + (y_u - y_i)^2 \qquad \text{Equation 7}$$

Constraints:

$y_l \leq y_i \leq y_u$ $i=1,2,3 \ldots nd$     Equation 8

$Y_{i,THM} \leq THM_{max}$     Equation 9

$y_l \leq U_j \leq y_u$ $j=1,2,3,4,5$     Equation 10 where, yi and $Y_{i,THM} = f(u)$
$y_i$=chlorine concentration at ith nodal point (mg/L)
nd=total number of nodes in the network
$y_l$=lower bound on chlorine concentration (mg/L)
$y_u$=upper bound on chlorine concentration (mg/L)
$Y_{i,THM}$=THM concentration at in node in each cluster (μg/L)
$THM_{max}$=max. concentration limit on THM concentration (80 μg/L)
$U_j$=disinfectant dosing concentration at $j_{th}$ booster station (mg/L)
U=Total disinfectant dosage vector $[U1, U2, U3, U4, U5]^T$ The system 100 initiates by selecting an initial guess value of coordinating variables as $U1=U1°$ and $U3=U3°$. The processor 100 executes an algorithm in an iterative manner until an optimal solution of all sub-problems at the first level also corresponds to the optimized solution at the second level.

As may be observed, each of the sub-problem j, $y_{ji}$ is a function of coordinating variables and local variable ($U_1$, $U_3$, $U_j$), reflecting the cause and effect relationship in the WDN. The execution of the algorithm in the iterative manner is known as the Model co-ordination as it modifies a mathematical model by adding one more equation of fixing the coordinating variable at the second level as $C=C°$ in every iteration.

The formulations discussed above (as described in the description of the first level and the second level) may be used for facilitating the local decision making for disinfectant dosing in a flow pattern considered in the CH/BP network. Natural Organic Matter (NOM) content and microbial quality data of incoming water in the multispecies model may be assumed on a basis of typical values found in a particular region. An incoming NOM content in water is considered as 1.03 mg/L and microbial quality is considered as 0.1 µg/L with a cell density of $10^9$ mgC/mL.

Figure 8:
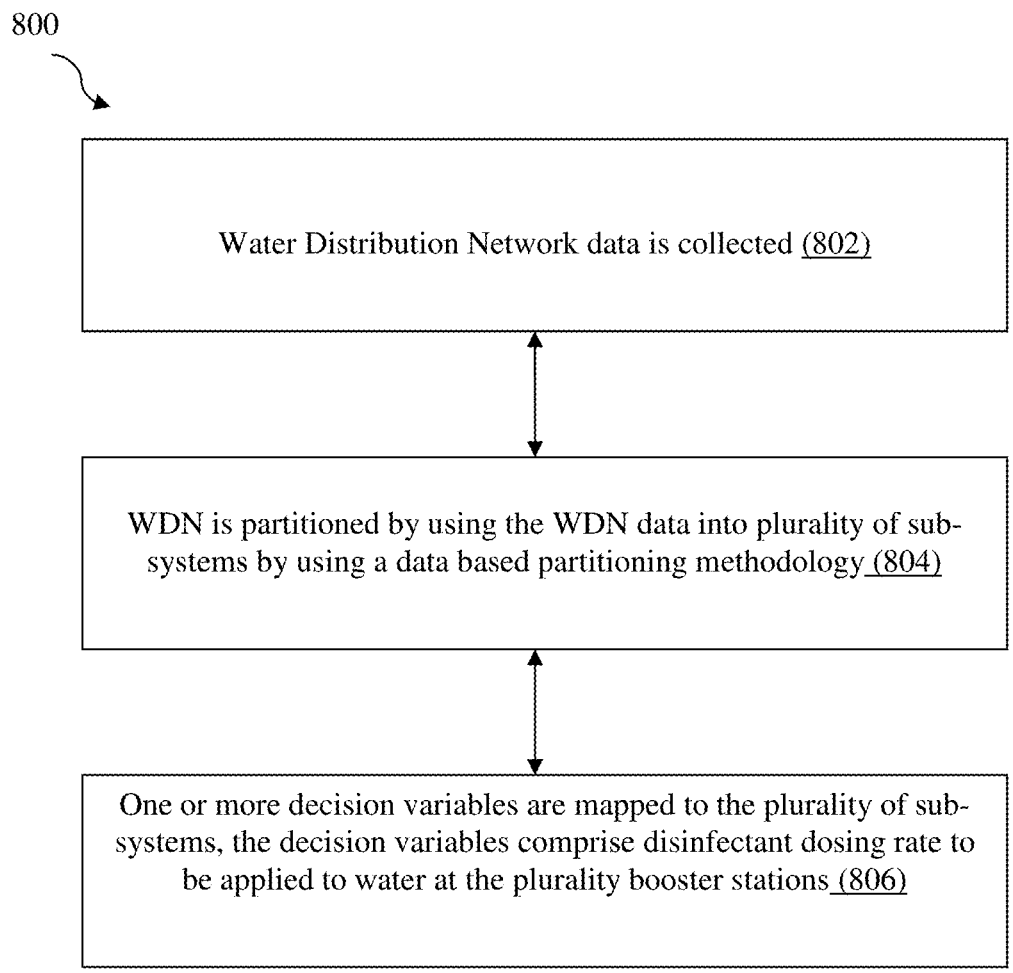
FIG. 8 illustrates a flow chart of a method facilitating a local decision making for disinfectant dosing in water in Water Distribution Networks (WDN), according to the embodiments as disclosed herein.

Referring to FIG. 8, a method 800 facilitating a local decision making for disinfectant dosing in water in Water Distribution Networks (WDN) is illustrated through a flowchart. The method 800 may be executed by the system 100 as discussed above.

At step 802, the WDN data is collected. At step 802, the WDN data is partitioned into one or more sub-systems by using a data based partitioning methodology.

At step 806, one or more decision variables are mapped to the one or more sub-systems. The decision variables comprise disinfectant dosing rate to be applied to water at the one or more dosage points (booster stations).

Description of the method 800 is similar to the system 100 and hence is not repeated for the sake of brevity.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method facilitating a local decision making for disinfectant dosing in water as the water flows through a Water Distribution Networks (WDN), the method comprising:
   receiving WDN data and disinfectant residual levels;
   determining clusters and one or more sub-systems of WDN by performing a Principal Component Analysis (PCA) over the WDN data and disinfectant residual levels;
   determining residual interactions by applying a partial correlation analysis approach on the clusters;
   determining one or more input-output pairs for decentralized control through the one or more sub-systems of the WDN and the residual interactions;
   determining nodes with similar behavior with respect to disinfectant dosing in the WDN data along with values of disinfectant dosage rate to be applied to the water at one or more booster stations; and
   applying WDN data to one or more booster stations for optimum disinfectant dosing.

2. The method as claimed in claim 1, wherein the WDN data comprises data related to distribution of water to demand nodes in the WDN and disinfectant dosage at each of the one or more booster stations in the WDN.

3. The method as claimed in claim 1, wherein the mapping is performed in order to minimize interactions, using the effective relative gain array analysis (ERGA) approach; and wherein nodes comprise demand nodes.

4. The method as claimed in claim 1, wherein the cluster comprises a cluster of nodes mapped to disinfectant dosing rate based on a local cause and effect relationships.

5. The method as claimed in claim 1, wherein a coordination approach is used for providing a coordinated decision-making regarding the disinfectant dosing rate during sudden contamination events in the WDN.

6. A system for facilitating a local decision making for disinfectant dosing in water in Water Distribution Networks (WDN), comprising:
   a processor and a memory coupled to the processor, wherein the memory stores a plurality of set of instructions to be executed by the processor, and wherein the processor is configured to:
   receive WDN data and disinfectant residual levels;
   determine clusters and one or more sub-systems of WDN by performing a Principal Component Analysis (PCA) over the WDN data and disinfectant residual levels;
   determine residual interactions by applying a partial correlation analysis approach on the clusters;
   determine one or more input-output pairs for decentralized control through the one or more sub-systems of the WDN and the residual interactions;
   determine nodes with similar behavior with respect to disinfectant dosing in the WDN data along with values of dosing disinfectant rate to be applied in the water at one or more booster stations; and
   apply WDN data to one or more booster stations for optimum disinfectant dosing.

7. The system as claimed in claim 6, wherein the mapping is performed with a view of minimum interactions, using the effective relative gain array analysis (ERGA) approach; and wherein nodes comprise demand nodes.

8. The system as claimed in claim 6, wherein a coordination approach is used for providing a coordinated decision-making regarding the disinfectant dosing rate.

* * * * *